United States Patent
Yang et al.

(10) Patent No.: US 9,447,898 B1
(45) Date of Patent: Sep. 20, 2016

(54) ULTRA-HIGH TEMPERATURE RIGIDITY SEAL BALL VALVE

(71) Applicant: ZHEJIANG PETROCHEMICAL VALVE CO., LTD., Wenzhou, Zhejiang (CN)

(72) Inventors: Rongshui Yang, Zhejiang (CN); Jingpan Su, Zhejiang (CN); Meilin Huang, Zhejiang (CN); Yongxi Li, Zhejiang (CN); Aiyi Huang, Zhejiang (CN); Hu Jin, Zhejiang (CN); Guangwu Xiang, Zhejiang (CN); Zhongyuan Wang, Zhejiang (CN); Fei Nan, Zhejiang (CN); Huaimin Wu, Zhejiang (CN); Wei Xiang, Zhejiang (CN)

(73) Assignee: ZHEJIANG PETROCHEMICAL VALVE CO., LTD., Zhejiang (CN)

( * ) Notice: Subject to any disclaimer, the term of this patent is extended or adjusted under 35 U.S.C. 154(b) by 0 days.

(21) Appl. No.: 14/905,955

(22) PCT Filed: Oct. 30, 2013

(86) PCT No.: PCT/CN2013/086183
§ 371 (c)(1),
(2) Date: Jan. 18, 2016

(87) PCT Pub. No.: WO2015/010381
PCT Pub. Date: Jan. 29, 2015

(30) Foreign Application Priority Data

Jul. 23, 2013 (CN) .......................... 2013 1 0310496

(51) Int. Cl.
*F16K 49/00* (2006.01)
*F16K 5/06* (2006.01)
*F16K 27/06* (2006.01)

(52) U.S. Cl.
CPC .............. *F16K 49/005* (2013.01); *F16K 5/06* (2013.01); *F16K 27/067* (2013.01); *F16K 49/007* (2013.01); *Y10T 137/6579* (2015.04)

(58) Field of Classification Search
CPC ............... F16K 49/005; F16K 49/007; Y10T 137/6416; Y10T 137/6579
USPC .................................. 137/334, 340; 251/172
See application file for complete search history.

(56) References Cited

U.S. PATENT DOCUMENTS 1,951,677 A * 3/1934 Rosener .................... C21B 9/12
  137/340
3,062,238 A * 11/1962 Boyd ....................... F16J 3/047
  251/172

(Continued)

FOREIGN PATENT DOCUMENTS

CN             2572155 Y      9/2003
CN           201588967 U      9/2010

(Continued)

*Primary Examiner* — Kevin Murphy
*Assistant Examiner* — Jonathan Waddy
(74) *Attorney, Agent, or Firm* — Christensen Fonder P.A.

(57) ABSTRACT

An ultra-high temperature (UHT) rigidity seal ball valve that includes an upper cover, a valve cover, a valve body, a valve rod and a ball body. The valve seat is arranged in the valve body; the valve rod penetrates the upper cover and the valve cover sequentially and connects to the ball body; a sealing element is arranged between the upper cover and the valve rod and between the valve cover and the valve rod; the ball body includes a medium channel; a hermetically-sealed cooling cavity encircles the outside of the medium channel of the ball body; a through hole allowing cooling liquid to pass through to the cooling cavity is formed in the valve rod. An accommodating cavity is arranged in the ball body; the through communicates with the accommodating cavity, so that cooling liquid can be introduced to a product when the valve operates at an ultra-high temperature.

9 Claims, 3 Drawing Sheets

(56) References Cited

U.S. PATENT DOCUMENTS

| | | | | |
|---|---|---|---|---|
| 3,213,876 | A | * | 10/1965 | Manton ................ F16K 49/002 137/340 |
| 4,261,385 | A | * | 4/1981 | Worley ................ F16K 49/007 137/340 |
| 4,353,388 | A | * | 10/1982 | Isoyama ............... F16K 1/2268 137/240 |
| 4,583,570 | A | * | 4/1986 | Rabe ..................... E21B 34/02 137/340 |
| 5,101,853 | A | * | 4/1992 | Mailliet ................ B65G 53/46 137/242 |
| 5,642,751 | A | * | 7/1997 | Crawley ............. B65D 90/582 137/340 |
| 6,050,289 | A | * | 4/2000 | Flores-Verdugo ........ F16K 5/20 137/340 |
| 2005/0269545 | A1 | | 12/2005 | Chiba et al. |
| 2011/0127456 | A1 | * | 6/2011 | Kenyon ................... F02K 7/06 251/314 |

FOREIGN PATENT DOCUMENTS

| | | |
|---|---|---|
| CN | 102364177 A | 2/2012 |
| CN | 202946708 U | 5/2013 |
| CN | 202971983 U | 6/2013 |
| CN | 103375604 A | 10/2013 |
| CN | 203384402 U | 1/2014 |
| EP | 0 202 666 A3 | 11/1986 |

* cited by examiner

ULTRA-HIGH TEMPERATURE RIGIDITY SEAL BALL VALVE

RELATED APPLICATIONS

The present application is a National Phase entry of PCT Application No. PCT/CN2013/086183, filed Oct. 30, 2013, which claims priority to Chinese Patent Application No. 201310310496.8, filed Jul. 23, 2013, 2013, the disclosures of which are hereby incorporated by reference herein in their entirety.

FIELD OF THE INVENTION

The invention relates to a valve, particularly to a UHT (ultra-high temperature) rigidity seal ball valve.

BACKGROUND

With the rapid development of science and technology and the continuous improvement of manufacturing techniques and product structures, ball valves, created in the 1950s, have rapidly developed to be one of the main valves within only 40 years. In western industrially developed countries, ball valves have been increasingly used year by year. In China, ball valves are extensively applied to industries like petroleum refining, long-distance transport pipes, chemical engineering, papermaking, pharmacy, water conservancy, electric power, municipal administration, iron and steel and the like, and occupy a unique position in national economy. The conventional rigidity seal ball valve has the advantages as follows: I, wear resistance: as the valve element of a rigidity seal ball valve is made of alloy steel by spray welding, and the sealing ring of the rigidity seal ball valve is made of alloy steel by build-up welding, the rigidity seal ball valve is less prone to too much wear and tear during opening and closing operations. II, long service life and wide application range: the conventional rigidity seal ball valve has been widely applied to petroleum, chemical engineering, power generation, papermaking, atomic energy, aviation, rockets and other divisions, as well as people's daily life. However, with the progress of society and the advance of science and technology, higher requirements on the rigidity seal ball valve are put forward, that is, the rigidity seal ball valve could still work normally at an ultra-high temperature for a long period of time, while a soft seal ball valve is prone to leakage of a sealing ring or seal seat at a temperature exceeding 250 DEG C. The conventional rigidity seal ball valve can work normally at the maximum temperature below 550 DEG C. Working under a high temperature or ultra-high temperature condition may easily result in deformation of a valve rod or a ball body. Once the valve rod deforms, working staff or a motor cannot drive the valve rod to move, the ball body cannot be opened or closed normally, great potential safety hazards may be caused; once the ball body deforms, the sealing performance of a product may easily become poorer, thereby ultimately causing a potential leakage risk.

SUMMARY

In order to solve the problem in the prior art that the conventional rigidity seal ball valve cannot work at an ultra-high temperature for a long period of time, the invention provides a UHT rigidity seal ball valve.

The technical scheme of the invention lies in that an UHT rigidity seal ball valve, comprising an upper cover, a valve cover, a valve body, a valve rod and a ball body, wherein a valve seat component is arranged in the valve body in a sleeving manner, the valve rod penetrates through the upper cover and the valve cover sequentially and is connected with the ball body, a sealing element is arranged between the upper cover and the valve rod as well as between the valve cover and the valve rod, a medium channel allowing a medium to flow through is arranged in the ball body, a hermetically sealed cooling cavity encircles the outer side of the medium channel of the ball body, a through hole allowing cooling liquid to pass through is formed in the valve rod, and the through hole is communicated with the cooling cavity.

As an improvement of the invention, the valve rod comprises an upper valve rod and a lower valve rod, wherein the upper valve rod and the ball body are in an integrated structure, and the lower valve rod is matched with the ball body.

As a further improvement of the invention, a cooling liquid inlet is formed in the lower valve rod, a cooling liquid outlet is formed in the upper valve rod, and the cooling liquid inlet in the lower valve rod is communicated with the cooling liquid outlet that is formed in the upper valve rod via the through hole in the valve rod and the cooling cavity.

As a further improvement of the invention, an annular ball body cover plate is arranged in the ball body, and the hermetically sealed cooling cavity is formed by the ball body cover plate and the inner wall of the ball body.

As a further improvement of the invention, a cooling channel allowing cooling liquid to flow through is arranged on each of the upper cover and the valve cover, and the cooling channels are communicated with the outer wall of the valve rod.

As a further improvement of the invention, the sealing elements are compressed tightly via disc springs.

As a further improvement of the invention, the valve seat component comprises a valve seat body, corrugated pipes and a valve seat supporting part; a valve body water inlet and a valve body water outlet are formed in the valve body; the valve body water inlet is communicated with an annular cooling tank that is arranged on the valve seat supporting part; the annular cooling tank is communicated with the outside via the external spaces of the corrugated pipes and the valve body water outlet.

As a further improvement of the invention, the corrugated pipes comprise first corrugated pipes and second corrugated pipes, first connecting rings and second connecting rings are connected onto the first corrugated pipes and the second corrugated pipes respectively, the first connecting rings are clung to the valve seat body, the second connecting rings are connected with the first corrugated pipes, the annular cooling tank is communicated with the internal spaces of the second corrugated pipes and the external spaces of the second corrugated pipes respectively, and the internal spaces of the second corrugated pipes are communicated with the outside via the external spaces of the first corrugated pipes and the valve body water outlet.

As a further improvement of the invention, the valve seat body is integrally formed by adopting a high temperature resistant material.

As a further improvement of the invention, jackets are welded on the outer surface of the valve body, an accommodating cavity is formed by the jackets and the outer surface of the valve body, and cooling water pipes are arranged on the jackets.

The invention has the benefits as follows: the cooling cavity is arranged in the ball body, the through hole is formed in the valve rod, and the through hole is communicated with the cooling cavity, so that cooling liquid can be introduced to a product when the rigidity seal ball valve works at an ultra-high temperature, the deformation of the valve rod and the ball body due to long-time working at an ultra-high temperature is avoided, both the service life and the working performance of the product are ensured, and a wider application range is achieved.

DETAILED DESCRIPTION

Figure 1:
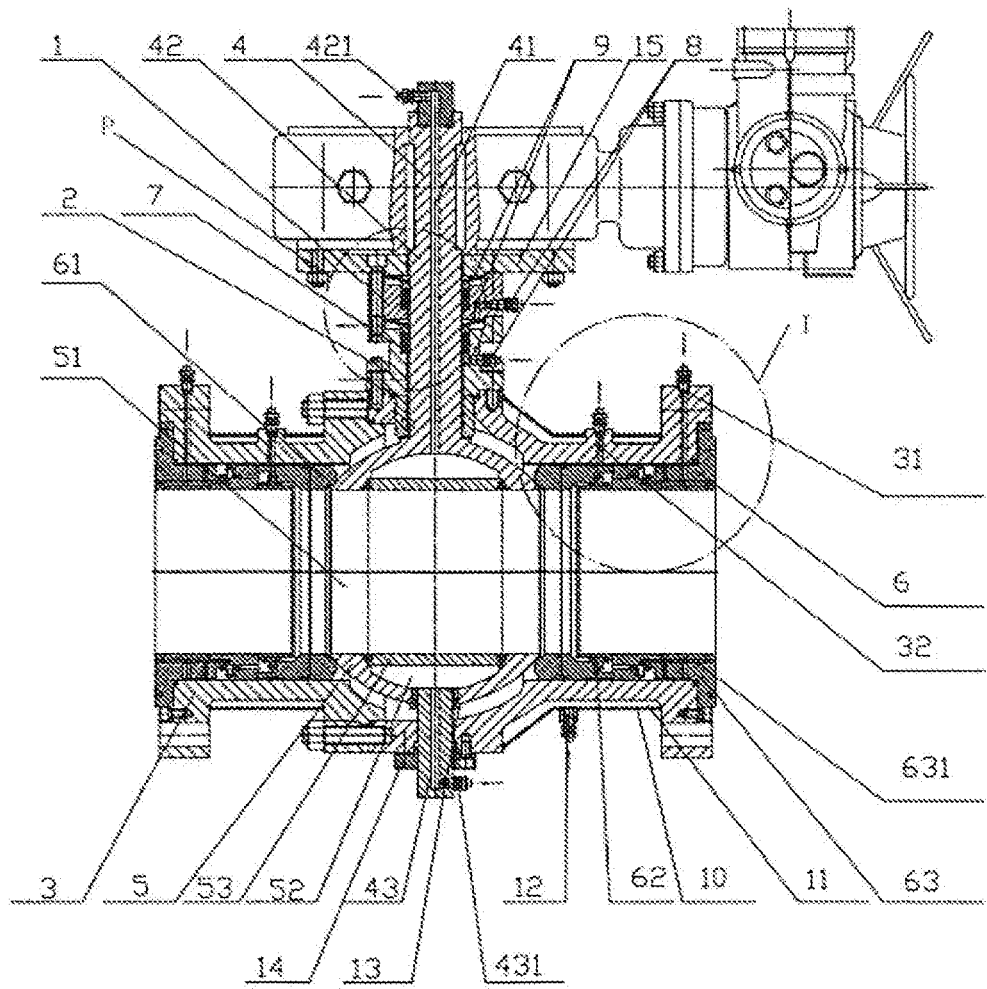
FIG. 1 is the structure diagram of an embodiment of the invention.
Figure 2:
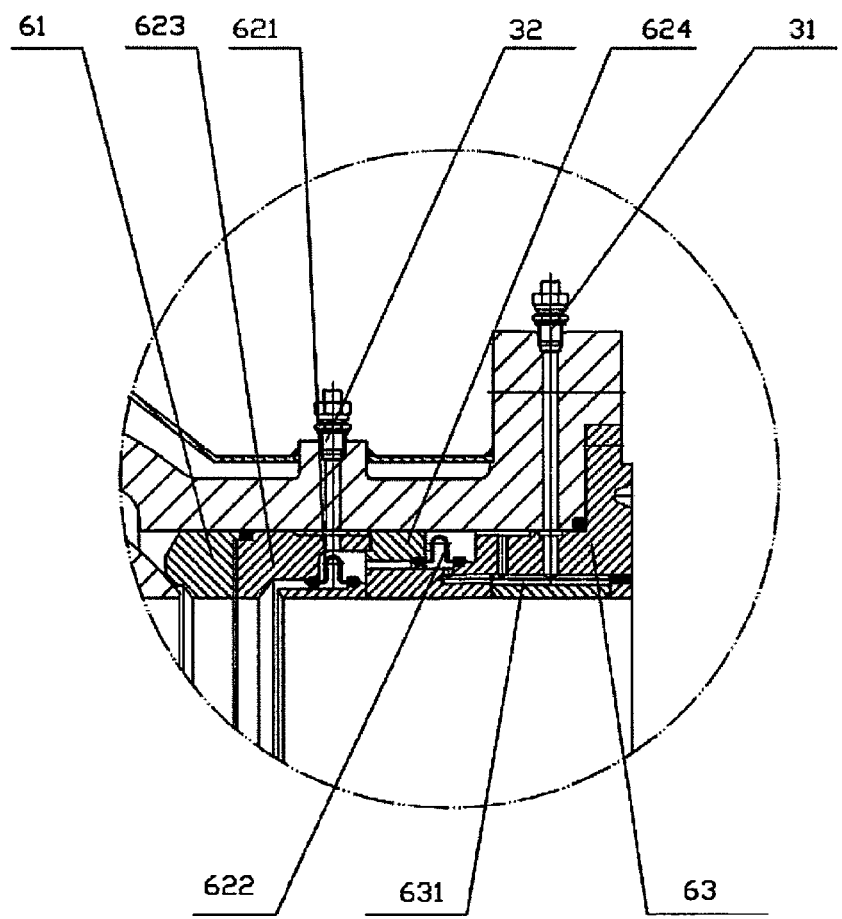
FIG. 2 is an enlarged diagram of part I in the FIG. 1.
Figure 3:
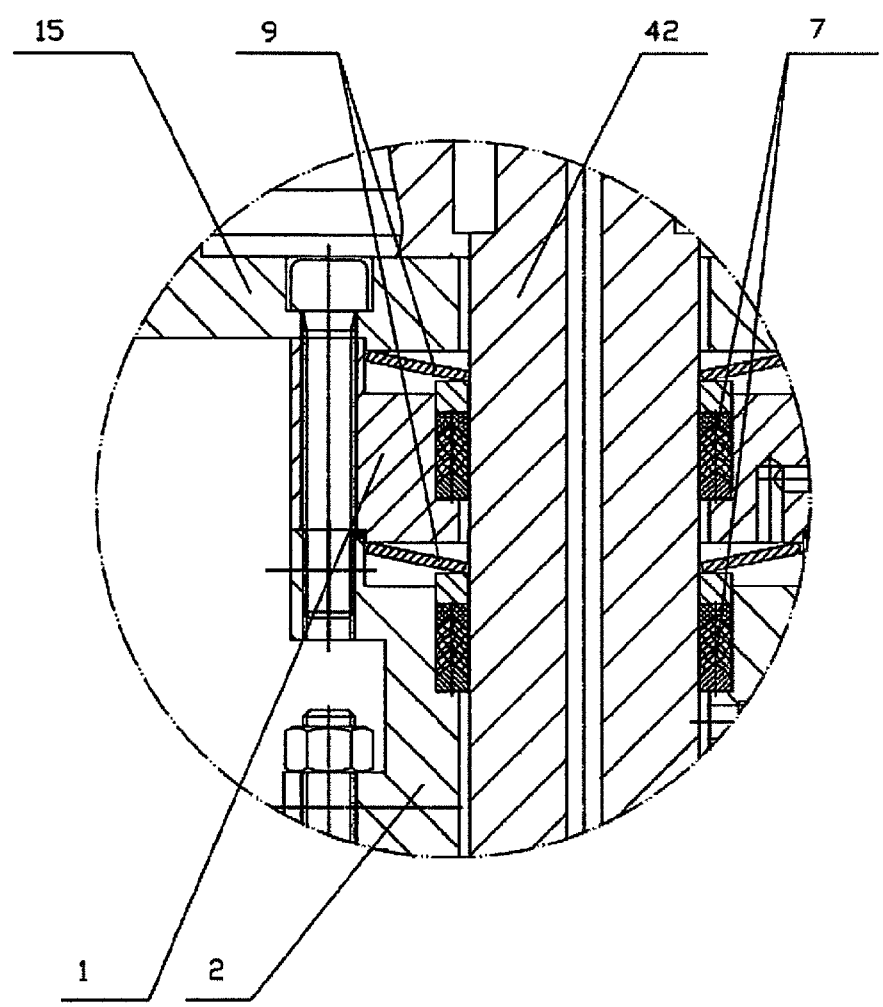
FIG. 3 is an enlarged diagram of part P in the FIG. 1.
In the FIGS.: 1, upper cover; 2, valve cover; 3, valve body; 31, valve body water inlet; 32, valve body water outlet; 4, valve rod; 41, through hole; 42, upper valve rod; 421, cooling liquid outlet; 43, lower valve rod; 431, cooling liquid inlet; 5, ball body; 51, medium channel; 52, cooling cavity; 53, ball body cover plate; 6, valve seat component; 61, valve seat body; 62, corrugated pipes; 621, first corrugated pipes; 622, second corrugated pipes; 623, first connecting ring; 624, second connecting ring; 63, valve seat supporting part; 631, annular cooling tank; 7, sealing elements; 8, cooling channels; 9, disc springs; 10, jackets; 11, accommodating cavity; 12, cooling water pipes; 13, valve rod sleeve; 14, lower valve rod cover; 15, connecting disc.

The embodiment of the invention is further described with reference to the drawings:

As shown in the FIGS. 1, 2 and 3, an UHT rigidity seal ball valve comprising an upper cover 1, a valve cover 2, a valve body 3, a valve rod 4 and a ball body 5, wherein a valve seat component 6 is arranged in the valve body 3 in a sleeving manner, which usually facilitates the installation of a product; the valve body 3 adopts a separated structure, generally a valve body comprises a left valve body and a right valve body, and the left valve body and the right valve body are fixedly connected via bolts. The valve rod 4 penetrates through the upper cover 1 and the valve cover 2 sequentially and is connected with the ball body 5, a sealing element 7 is arranged between the upper cover 1 and the valve rod 4 as well as between the valve cover 2 and the valve rod 4, a medium channel 51 allowing a medium to flow through is arranged in the ball body 5, a hermetically sealed cooling cavity 52 encircles the outer side of the medium channel 51 of the ball body 5, a through hole 41 allowing cooling liquid to pass through is formed in the valve rod 4, and the through hole 41 is communicated with the cooling cavity 52. The cooling liquid adopted in the invention is cooling water. Specifically, an annular ball body cover plate 53 is arranged in the ball body 5, and a hermetically sealed cooling cavity 52 is formed by the ball body cover plate 53 and the inner wall of the ball body 5. More specifically, the ball body cover plate 53 is fixed with the ball body by welding. By adopting such structure, the cooling cavity can be processed and produced more conveniently. Generally, a cooling cavity is annular, and may be further processed into other shapes. According to the invention, the cooling cavity is arranged in the ball body, the through hole is formed in the valve rod, and the through hole is communicated with the cooling cavity, so that cooling liquid can be introduced to a product when the rigidity seal ball valve works at an ultra-high temperature, the deformation of the valve rod and the ball body due to long-time working at an ultra-high temperature is avoided, both the service life and the working performance of the product are ensured, a wider application range is achieved, and the product can work normally at least at an ultra-high temperature of 900 DEG C for a long period of time.

The valve rod 4 comprises an upper valve rod 42 and a lower valve rod 43, the upper valve rod 42 and the ball body 5 are in an integrated structure, and the lower valve rod 43 is matched with the ball body 5. A cooling liquid inlet 431 is formed in the lower valve rod 43, a cooling liquid outlet 421 is formed in the upper valve rod 42, and the cooling liquid inlet 431 in the lower valve rod 43 is communicated with the cooling liquid outlet 421 that is formed in the upper valve rod 42 via the through hole 41 in the valve rod 4 and the cooling cavity 52. By adopting the structure of the upper valve rod and the lower valve rod, the disassembly, assembly and maintenance of the product are very convenient; as the upper valve rod and the ball body are in an integrated structure, the product has better strength, and at the same time the ball body can be cooled conveniently. In the invention, cooling water is introduced from the lower valve rod, and is discharged from the upper valve rod via the cooling cavity in the ball body, thus cooling water circulation is formed, which ensures that the ball body and the valve rod can be sufficiently and effectively cooled. Specifically, a valve rod sleeve 13 is arranged at the lower part of the ball body 5; the edge of the valve rod sleeve 13 is bent outwards; a lug boss is arranged at the middle of the lower valve rod 43; during the installation, the lower valve rod 43 penetrates through the valve body 3, the lug boss of the lower valve rod is clamped with the valve body 3, the edge of the valve rod sleeve 13 is clamped with the ball body at the moment, the lower valve rod 43 is fixed with a lower valve rod cover 14 via a screw, thus the installation of the lower valve rod 43 is completed.

A cooling channel 8 allowing cooling liquid to flow through is arranged on each of the upper cover 1 and the valve cover 2, and the cooling channels 8 are communicated with the outer wall of the valve rod 4. The upper valve rod is relatively longer, and cooling water in the valve rod flows to the upper valve rod from the lower valve rod, so that such structure can further ensure that the valve rod is cooled reliably, the product can be adaptable to working for a longer period of time, which is a preferable scheme of the invention.

The sealing elements 7 are compressed tightly via disc springs 9. Specifically, one end of each disc spring 9 is propped against the corresponding sealing element 7, and the other end of each disc spring 9 is propped against a corresponding fixing part on the rigidity seal ball vale. For example, if one end of each disc spring 9 is propped against the sealing element that is arranged on the upper cover, the other end of the disc spring 9 is propped against a connecting disc 15 on the product; if one end of each disc spring 9 is propped against the sealing element that is arranged on the valve cover, the other end of the disc spring 9 is propped against the upper cover. Generally in the invention, the sealing elements are sealed by adopting a filler. By adopting such structure, a sealing element gland and a bolt fastener are not needed, and once the sealing elements are worn, the sealing of the product can also be ensured due to the automatic compensating function of the disc springs.

The valve seat component 6 comprises a valve seat body 61, corrugated pipes 62 and a valve seat supporting part 63, wherein a valve body water inlet 31 and a valve body water outlet 32 are formed in the valve body 3, the valve body water inlet 31 is communicated with an annular cooling tank 631 that is arranged on the valve seat supporting part 63, and the annular cooling tank 631 is communicated with the outside via the external spaces of the corrugated pipes 62 and the valve body water outlet 32. The corrugated pipes provide pre-tightening force for the valve seat body, which allows the valve seat to compress the corrugated pipes when the ball body expands after being heated, thus the sealing surface is prevented from being damaged by interlocking, and the sealing performance of the product is ensured. At the same time, due to the arrangement of the annular cooling tank, the corrugated pipes can be cooled to ensure that the valve seat component can work normally at an ultra-high temperature.

Specifically, the corrugated pipes 62 comprise first corrugated pipes 621 and second corrugated pipes 622, wherein first connecting rings 623 and second connecting rings 624 are connected onto the first corrugated pipes 621 and the second corrugated pipes 622 respectively, the first connecting rings 623 are clung to the valve seat body 61, the second connecting rings 624 are connected with the first corrugated pipes 621, the annular cooling tank 631 is communicated with each of the internal spaces of the second corrugated pipes 622 and the external spaces of the second corrugated pipes 622, and the internal spaces of the second corrugated pipes 622 are communicated with the outside via the external spaces of the first corrugated pipes 621 and the valve body water outlet 32. Through the arrangement of the two groups of corrugated pipes, the pre-tightening force on the valve seat body, during the installation, is greater, so that after working, even if the ball body expands after being heated, the range of compression of the corrugated pipes on the valve seat body is enlarged, the sealing performance of the product is better, and the service life is longer; moreover, as the space in the valve seat component facilitates flowing of cooling water, the valve seat component can be cooled, and the long-time working capacity of the product at a high temperature is further enhanced.

The valve seat body 61 is integrally formed by adopting a high temperature resistant material. Specifically, the valve seat body is made of GH3128 high temperature alloy steel, which allows the valve seat body to have better high temperature resistance, thus leakage due to deformation of the valve seat body is avoided.

Jackets 10 are welded on the outer surface of the valve body 3, an accommodating cavity 11 is formed between the jackets 10 and the outer surface of the valve body 3, and a cooling water pipe 12 is arranged on each of the jackets 10. Specifically, in the invention, the jacket 10 and the cooling water pipe are arranged on each of the left valve body and the right valve body. By adopting such structure, the valve body can be cooled, the surface temperature of the valve body can be lower than 100 DEG C, the product can be more adaptable to long-time working at an ultra-high temperature, and at, the same time the working personnel can be prevented from being accidentally injured by high temperature.

All technical personnel should know that although the invention is described in detail according to the detailed description, the idea of the invention is not limited by the utility model, and any modification made by using the idea of the invention should be contained in the scope of protection of the patent rights of the patent.

The invention claimed is:

1. A UHT (ultra-high temperature) rigidity seal ball valve, comprising an upper cover, a valve cover, a valve body, a valve rod and a ball body, wherein a valve seat component is arranged in the valve body in a sleeving manner; the valve rod penetrates through the upper cover and the valve cover sequentially and is connected with the ball body; a sealing element is arranged between the upper cover and the valve rod as well as between the valve cover and the valve rod; a medium channel allowing a medium to flow through is arranged in the ball body; a hermetically sealed cooling cavity encircles the outer side of the medium channel of the ball body; a through hole allowing cooling liquid to pass through is formed in the valve rod; the through hole is communicated with the cooling cavity; the valve seat component comprises a valve seat body, corrugated pipes and a valve seat supporting part; a valve body water inlet and a valve body water outlet are formed in the valve body; the valve body water inlet is communicated with an annular cooling tank that is arranged on the valve seat supporting part; the annular cooling tank is communicated with the outside via the external spaces of the corrugated pipes and the valve body water outlet the valve body water inlet communicates with the valve body water outlet via the annular cooling tank.

2. The UHT rigidity seal ball valve according to claim 1, wherein the valve rod comprises an upper valve rod and a lower valve rod, the upper valve rod and the ball body are in an integrated structure, and the lower valve rod is matched with the ball body.

3. The UHT rigidity seal ball valve according to claim 2, wherein a cooling liquid inlet is formed in the lower valve rod, a cooling liquid outlet is formed in the upper valve rod, and the cooling liquid inlet in the lower valve rod is communicated with the cooling liquid outlet that is formed in the upper valve rod via the through hole in the valve rod and the cooling cavity.

4. The UHT rigidity seal ball valve according to claim 1, wherein an annular ball body cover plate is arranged in the ball body, and the hermetically sealed cooling cavity is formed by the ball body cover plate and the inner wall of the ball body.

5. The UHT rigidity seal ball valve according to claim 1, wherein a cooling channel allowing cooling liquid to flow through is arranged on each of the upper cover and the valve cover, and the cooling channels are communicated with the outer wall of the valve rod.

6. The UHT rigidity seal ball valve according to claim 5, wherein the valve seat body is integrally formed by adopting a high temperature resistant material.

7. The UHT rigidity seal ball valve according to claim 1, wherein the sealing elements are compressed tightly via disc springs.

8. The UHT rigidity seal ball valve according to claim 1, wherein the corrugated pipes comprise first corrugated pipes and second corrugated pipes, first connecting rings and second connecting rings are connected onto the first corrugated pipes and the second corrugated pipes respectively, the first connecting rings are clung to the valve seat body, the second connecting rings are connected with the first corrugated pipes, the annular cooling tank is communicated with each of the internal spaces of the second corrugated pipes and the external spaces of the second corrugated pipes, and the internal spaces of the second corrugated pipes are communicated with the outside via the external spaces of the first corrugated pipes and the valve body water outlet.

9. The UHT rigidity seal ball valve according to claim 1, wherein jackets are welded on the outer surface of the valve body, an accommodating cavity is formed by the jackets and the valve body, and cooling water pipes are arranged on the jackets.

* * * * *